US012372186B2

(12) United States Patent
Caillot et al.

(10) Patent No.: US 12,372,186 B2
(45) Date of Patent: Jul. 29, 2025

(54) ROBOTIZED MANIFOLD SYSTEM COMPRISING A PLURALITY OF BISTABLE VALVES

(71) Applicant: ABB SCHWEIZ AG, Baden (CH)

(72) Inventors: Alexandre Caillot, Muz-la-Chiesaz (FR); Christopher Pierce, Gresy-sur-Aix (FR)

(73) Assignee: ABB SCHWEIZ AG, Baden (CH)

( * ) Notice: Subject to any disclaimer, the term of this patent is extended or adjusted under 35 U.S.C. 154(b) by 14 days.

(21) Appl. No.: 18/580,923

(22) PCT Filed: Jul. 19, 2022

(86) PCT No.: PCT/EP2022/070148
§ 371 (c)(1),
(2) Date: Jan. 19, 2024

(87) PCT Pub. No.: WO2023/001796
PCT Pub. Date: Jan. 26, 2023

(65) Prior Publication Data
US 2024/0360944 A1    Oct. 31, 2024

(30) Foreign Application Priority Data
Jul. 19, 2021    (EP) ..................... 21186387

(51) Int. Cl.
*F16L 41/03*      (2006.01)
*F16K 11/22*      (2006.01)
*F16K 31/00*      (2006.01)

(52) U.S. Cl.
CPC .............. *F16L 41/03* (2013.01); *F16K 11/22* (2013.01); *F16K 31/003* (2013.01)

(58) Field of Classification Search
CPC . F16K 27/003; F16K 11/22; B25J 5/02; F16L 41/03; Y10T 137/87885
See application file for complete search history.

(56) References Cited

U.S. PATENT DOCUMENTS

2023/0272867 A1\* 8/2023 McFetridge ........ F16K 31/0655
335/229

FOREIGN PATENT DOCUMENTS

DE    19856252 A1    6/2000
FR    2991426 A3    12/2013
(Continued)

OTHER PUBLICATIONS

International Search Report for International Application No. PCT/EP2022/070148; Mailing Date, Oct. 24, 2022.
(Continued)

*Primary Examiner* — Reinaldo Sanchez-Medina
*Assistant Examiner* — Nicole Gardner
(74) *Attorney, Agent, or Firm* — CANTOR COLBURN LLP

(57) ABSTRACT

A Robotized manifold system including a pipe matrix including a first series of pipes extending according to a first direction and being comprised in a first layer of the pipe matrix and a second series of pipes extending according to a second direction transverse to the first direction and extending in a second layer of the pipe matrix, the pipe matrix being organized according to at least two walls extending transversally to each other or at least one curved wall, each wall including a portion of the first layer and the second layer; a plurality of bistable valves being distributed on the at least two walls or at least one curved wall, each bistable valve including a shutter body configured to constitute a portion of a pipe of the first series and a portion of a pipe of the second series in a line position and to link the pipes of the first series and second series in a transverse position; a robot with an arm configured to individually actuate each shutter body of the bistable valves.

20 Claims, 3 Drawing Sheets

(56) References Cited

FOREIGN PATENT DOCUMENTS

GB            2342504   A      4/2000
WO          03024863   A2     3/2003

OTHER PUBLICATIONS

Written Opinion for International Application No. PCT/EP2022/070148; Mailing Date, Oct. 24, 2022.

\* cited by examiner

ROBOTIZED MANIFOLD SYSTEM COMPRISING A PLURALITY OF BISTABLE VALVES

CROSS REFERENCE TO RELATED APPLICATIONS

This application is a National Stage of PCT Application No. PCT/EP2022/070148 filed on Jul. 19, 2022, which claims priority to European Patent Application No. 21186387.3 on Jul. 19, 2021, the contents each of which are incorporated herein by reference thereto.

TECHNICAL FIELD

The present invention concerns a robotized manifold system comprising a plurality of bistable valves.

BACKGROUND

It is known to use a manifold system in industrial applications for preparing products such as lubricants and greases, paints and varnishes, paper, chemicals, perfumes, wherein raw fluids are used to prepare semi-finished products and finished products.

The manifold system is used at all stages of the process, for conveying and/or mixing raw materials, semi-finished products and finished products. To that purpose, the manifold system comprises pipes and valves to define different piping configurations.

In addition, the pipes should be conceived and installed to be easily cleaned, for example thanks to pigs that circulate in the manifold system to push the remaining fluid outside the pipes.

There is therefore a need to actuate the valves in a reliable way. The installation of such a manifold system in an existing factory can become challenging if the space is reduced. The piping as well as the actuation of the valve should also be accessible for maintenance.

The present invention aims to solve all or some of the disadvantages mentioned above.

BRIEF SUMMARY

For this purpose, the present disclosure relates to a robotized manifold system comprising:
- a pipe matrix including a first series of pipes extending according to a first direction and being comprised in a first layer of the pipe matrix and a second series of pipes extending according to a second direction transverse to the first direction and extending in a second layer of the pipe matrix, said pipe matrix being organized according to at least two walls extending transversally to each other or at least one curved wall, each wall comprising a portion of the first layer and the second layer,
- a plurality of bistable valves being distributed on said at least two walls or at least one curved wall, each bistable valve including a shutter body configured to constitute a portion of a pipe of the first series and a portion of a pipe of the second series in a line position and to link said pipes of the first series and second series in a transverse position,
- a robot with an arm configured to individually actuate each shutter body of the bistable valves.

In other words, the pipe matrix comprises a first layer and a second layer for conveying fluids and each bistable valve either separates a pipe of the first series and a pipe of the second series or links said pipes.

Bistable valve means that when actuated from one position to the other, said bistable valve remains in position. There is no need to physically maintain the valve after actuation. When the terms transverse or transversally is used, it means constituting an angle of at least 30°.

Each bistable valve can be actuated mechanically and independently with a single mechanical actuator, i.e. the arm. As the pipe matrix comprises at least two walls extending transversally, the robotized manifold system can have a limited size.

The arm used as a single mechanical actuator of the plurality of bistable valves enables to minimize the equipment used for actuation. This engenders free space in proximity of the bistable valves which facilitates the installation of the robotized manifold system in a reduced space.

Maintenance as well is reduced and easy thanks to the reliability of the arm that has few moving parts. The simple design of the robotized manifold system also reduces investment cost.

According to an aspect of the present disclosure, each shutter body of the plurality of bistable valves is arranged to rotate between the line position and the transverse position according to an actuating axis transverse to an extension plane of the wall on which said shutter body is installed.

The shutter bodies of the bistable valves of a wall have therefore the same orientation which is transverse to said wall. This provision allows to easily and reliably actuate the bistable valves with the arm. Indeed, the arm can move from one valve to the other and rotate the corresponding shutter body.

In addition, there is no translation of the shutter body transversally to the corresponding wall. This reduces the overall depth of the walls.

According to an aspect of the present disclosure, each bistable valve comprises a removable external flange, the corresponding shutter body being withdrawable from the rest of said bistable valve transversally to the extension plane of the wall on which said shutter body is installed when the external flange is removed.

This provision facilitates the maintenance of the bistable valves. There is no need to dismantle other bistable valves or structural elements of pipe matrix. Preferably, each bistable valve comprises two removable external flanges on both of its extremities to allow to withdraw the shutter body from both sides of the wall.

According to an aspect of the present disclosure, each external flange presents a central access window to an actuating element of the corresponding shutter body. The actuating element is a groove configured to cooperate with an extremity tool of the arm. Said groove can present an oblong form.

According to an aspect of the present disclosure, the pipe matrix comprises three walls organized according to a U shape, the robot being located between the two walls facing each other.

This provision facilitates the actuation of the bistable valves by the arm as the distance to each valve is limited. The overall size of the robotized manifold system is therefore limited.

There is also a security aspect to this configuration as the robot is surrounded by the walls. This creates a safety zone that could be delimited to prevent access in proximity of the robot when operating.

According to an aspect of the present disclosure, the pipes of the first series each comprises an elbow portion between the at least two walls.

In other words, the first direction has straight portions within the walls and curved portions between the walls.

According to an aspect of the present disclosure, each wall comprises of a plurality of valve modules, each valve module comprising bistable valves organized in lines and columns and connecting ports at both ends of the lines to the first series of pipes and at both ends of the columns to the second series of pipes.

This provision facilitates the installation of the walls, as each wall comprises a plurality of prefabricated valve modules. The adaptation of the pipe matrix in the factory is easy because the dimensions of the walls is adaptable.

According to an aspect of the present disclosure, the pipe matrix comprises a stand assembly arranged to be set on a flat ground, the stand assembly comprising at least two unitary elements, each being dedicated for a corresponding wall, the first direction being horizontal and the second direction being vertical.

The stand assembly helps placing the walls on the flat ground and align the first direction and the second direction horizontally and vertically.

According to an aspect of the present disclosure, the stand assembly comprises feet to position the at least two walls at a determined distance from the flat ground.

This provision enables the arm to easily actuate the bistable valves since the lowest bistable valves are distant from the flat ground level.

According to an aspect of the present disclosure, the robotized manifold system comprises lower inlet and outlet pipes linked to corresponding pipes of the second series, said lower inlet and outlet pipes being curved to change from a vertical orientation at a connection area with the pipes of the second series to a horizontal orientation.

The connection area with the pipes of the second series is distant from the flat ground. The lower inlet and outlet pipes can then be used to drain the pipes or to connect the pipe matrix with a product source that is set horizontally.

This construction also participates to the limited size of the robotized manifold system.

According to an aspect of the present disclosure, each pipe of the first series and of the second series are configured to enable the circulation of a pig for cleaning said pipe when all the corresponding bistable valves are in line position.

This construction enables to wash the pipes including the portions corresponding to the inside of the shutter body. The pig is designed to scrap the pipes.

According to an aspect of the present disclosure, the arm comprises at least three fractions configured to rotate with respect to each other and a centralized command arrangement including sensors for controlling said arm.

According to an aspect of the present disclosure, the robotized manifold system comprises a guiding structure configured to receive the robot, the robot being configured to move between two end positions when received in the guiding structure.

The guiding structure thus enables the arm to actuate a larger set of bistable valves as the robot is movable when received in the guiding structure. According to an aspect of the present disclosure, the guiding structure is configured to enable a displacement of the robot according to a translation between the two end positions.

According to an aspect of the present disclosure, the translation is according to a trajectory extending between and parallel to the two walls of the pipe matrix facing each other.

According to an aspect of the present disclosure, the guiding structure is a rail structure configured to cooperate with a complementary support structure of the robot.

Alternatively, the robotized manifold system may not include a guiding structure. In that case, the robotized manifold system can comprise a base configured to cooperate with the ground and on which the robot is installed. Indeed, it might not be necessary to move the robot depending on the spatial configuration of the robotized manifold system. The base can also be integral with the robot.

According to an aspect of the present disclosure, the robotized manifold system comprises a protection cage configured to be installed around the plurality of bistable valves and the robot.

According to an aspect of the present disclosure, the protection cage comprises joined panels disposed around the walls and the robot. Preferably, each panel comprises at least one transparent portion. In particular, the protection cage is configured to have a moving portion such as a door to penetrate inside an area defined by the protection cage.

The present disclosure also concerns an installation comprising the robotized manifold system and a plant managing entity for controlling the robotized manifold system. The plant managing entity is dedicated for the global command of the installation and the synchronization with other machines of the installation that can be coupled with the robotized manifold system.

The different aspects defined above that are not incompatible can be combined.

BRIEF DESCRIPTION OF THE DRAWINGS

The present disclosure will be better understood with the aid of the detailed description that is set out below with reference to the appended drawing in which.

DETAILED DESCRIPTION

In the following detailed description of the figures defined above, the same elements or the elements that are fulfilling identical functions may retain the same references so as to simplify the understanding of the present disclosure.

Figure 1:
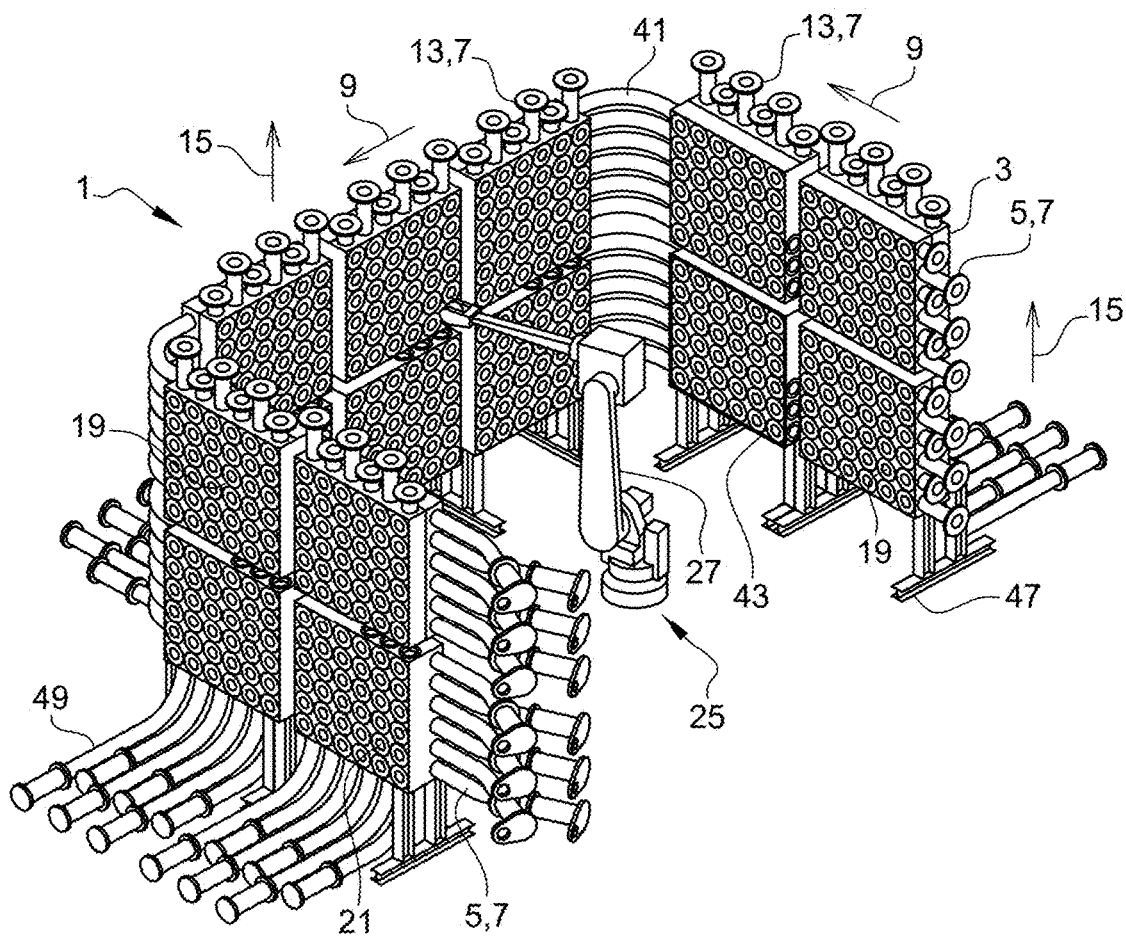
FIG. 1 is a perspective view of a robotized manifold assembly.
Figure 2:
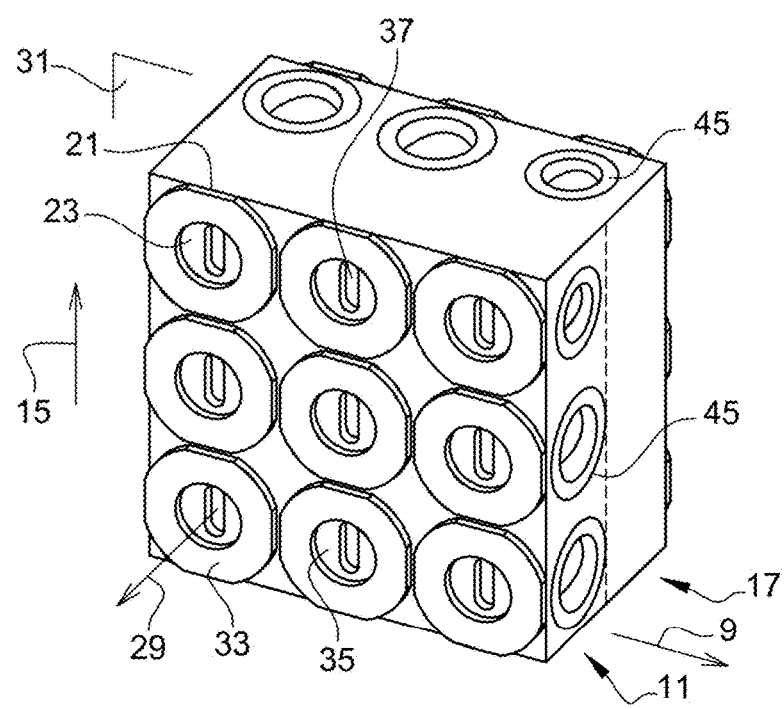
FIG. 2 is a perspective view of a valve module of the robotized manifold assembly.
Figure 3:
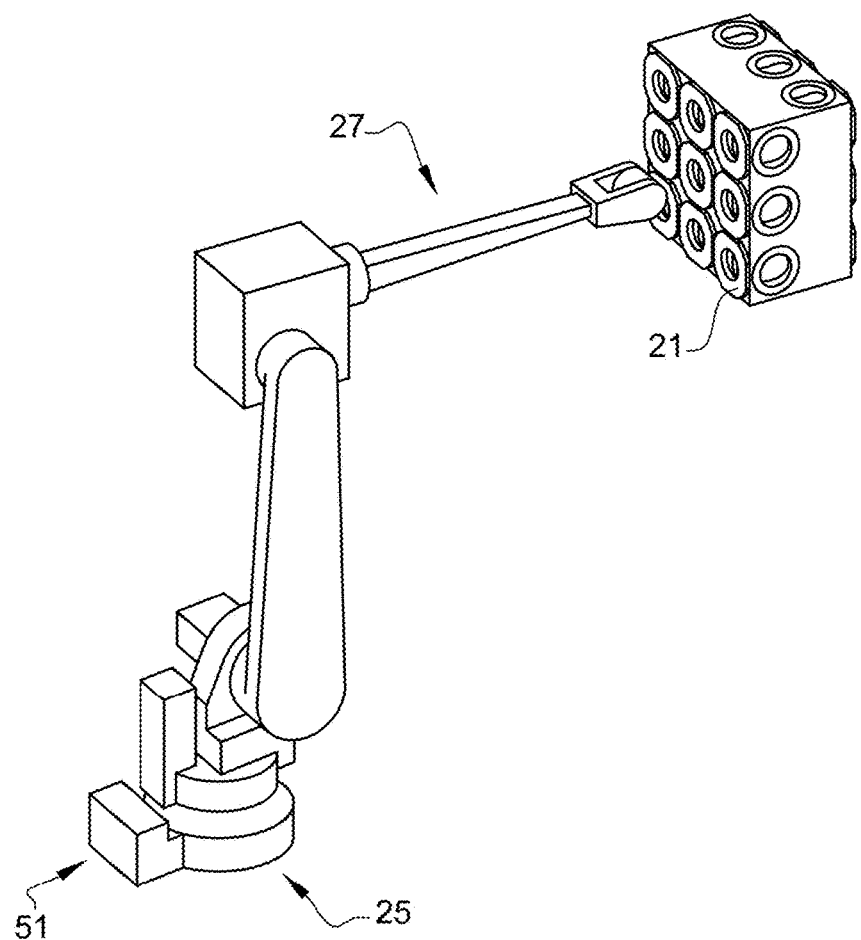
FIG. 3 is a perspective view of a robot with an arm and a valve module.

As illustrated in FIGS. 1 to 3, a robotized manifold system 1 comprises a pipe matrix 3 including a first series 5 of pipes 7 extending according to a first direction 9 and being comprised in a first layer 11 of the pipe matrix 3 and a second series 13 of pipes 7 extending according to a second direction 15 transverse to the first direction 9 and extending in a second layer 17 of the pipe matrix 3.

The pipe matrix 3 is organized according to at least two walls 19 extending transversally to each other, each wall 19 comprising a portion of the first layer 11 and the second layer 17.

The robotized manifold assembly 1 comprises a plurality of bistable valves 21 being distributed on said at least two walls 19, each bistable valve 21 including a shutter body 23 configured to constitute a portion of a pipe 7 of the first series 5 and a portion of a pipe 7 of the second series 13 in a line position and to link said pipes 7 of the first series 5 and second series 13 in a transverse position.

The robotized manifold assembly 1 also comprises a robot 25 with an arm 27 configured to individually actuate each shutter body 23 of the bistable valves 21.

In other words, the pipe matrix 3 comprises a first layer 11 and a second layer 17 for conveying fluids and each bistable valve 21 either separates a pipe 7 of the first series 5 and a pipe 7 of the second series 13 or links said pipes 7.

Each bistable valve 21 can be actuated mechanically and independently with a single mechanical actuator, i.e. the arm 27.

Each shutter body 23 of the plurality of bistable valves 21 is arranged to rotate between the line position and the transverse position according to an actuating axis 29 transverse to an extension plane 31 of the wall 19 on which said shutter body 23 is installed.

The shutter bodies 23 of the bistable valves 21 of a wall 19 have therefore the same orientation which is transverse to said wall 19.

Each bistable valve 21 comprises a removable external flange 33, the corresponding shutter body 23 being withdrawable from the rest of said bistable valve 21 transversally to the extension plane 31 of the wall 19 on which said shutter body 23 is installed when the external flange 33 is removed.

Preferably, each bistable valve 21 comprises two removable external flanges 33 on both of its extremities to allow to withdraw the shutter body 23 from both sides of the wall 19.

Each external flange 33 presents a central access window 35 to an actuating element 37 of the corresponding shutter body 23. The actuating element 37 is a groove configured to cooperate with an extremity tool of the arm 27. Said groove can present an oblong form.

More specifically, the illustrated pipe matrix 3 comprises three walls 19 organized according to a U shape, the robot 25 being located between the two walls 19 facing each other.

The pipes 7 of the first series 5 each comprises an elbow portion 41 between the at least two walls 19. In other words, the first direction 9 has straight portions within the walls 19 and curved portions between the walls 19.

Each wall 19 comprises of a plurality of valve modules 43, each valve module 43 comprising bistable valves 21 organized in lines and columns and connecting ports 45 at both ends of the lines to the first layer 11 of pipes 7 and at both ends of the columns to the second layer 17 of pipes 7.

The pipe matrix 3 comprises a stand assembly 47 arranged to be set on a flat ground, the stand assembly 47 comprising at least two unitary elements, each being dedicated for a corresponding wall 19, the first direction 9 being horizontal and the second direction 15 being vertical.

The stand assembly 47 comprises feet to position the at least two walls 19 at a determined distance from the flat ground.

The robotized manifold system 1 comprises lower inlet and outlet pipes 49 linked to corresponding pipes 7 of the second series 13, said lower inlet and outlet pipes 49 being curved to change from a vertical orientation at a connection area with the pipes 7 of the second series 13 to a horizontal orientation.

The connection area with the pipes 7 of the second series 13 is distant from the flat ground. The lower inlet and outlet pipes 49 can then be used to drain the pipes 7 or to connect the pipe matrix 3 with a product source that is set horizontally.

Each pipe 7 of the first series 5 and of the second series 13 are configured to enable the circulation of a pig for cleaning said pipe 7 when all the corresponding bistable valves 21 are in line position.

As illustrates in FIG. 3, the arm 27 comprises at least three fractions configured to rotate with respect to each other, and a centralized command arrangement 51 including sensors for controlling said arm 27.

Figure 4:
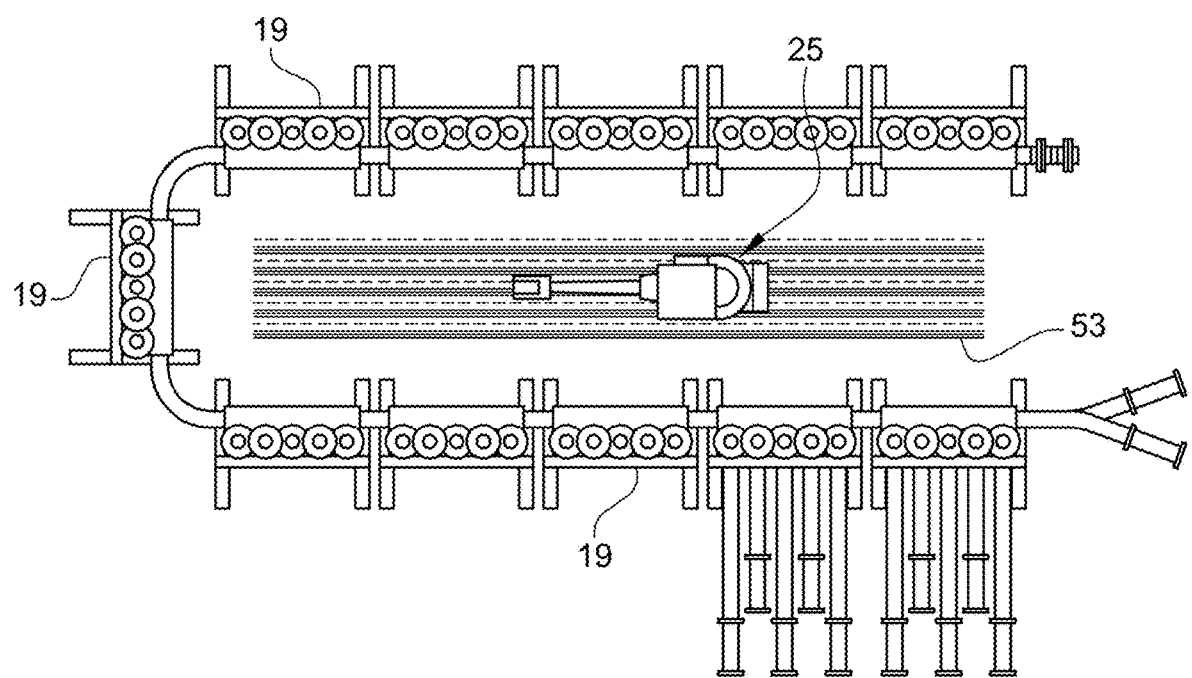
FIG. 4 is a top view of the robotized manifold system.

As illustrated in FIG. 4, the robotized manifold system 1 comprises a guiding structure 53 configured to receive the robot 25, the robot 25 being configured to move between two end positions when received in the guiding structure 53.

The guiding structure 53 is configured to enable a displacement of the robot 25 according to a translation between the two end positions. The translation is according to a trajectory extending between and parallel to the two walls 19 of the pipe matrix 3 facing each other.

The guiding structure 53 is a rail structure configured to cooperate with a complementary support structure of the robot 25.

Figure 5:
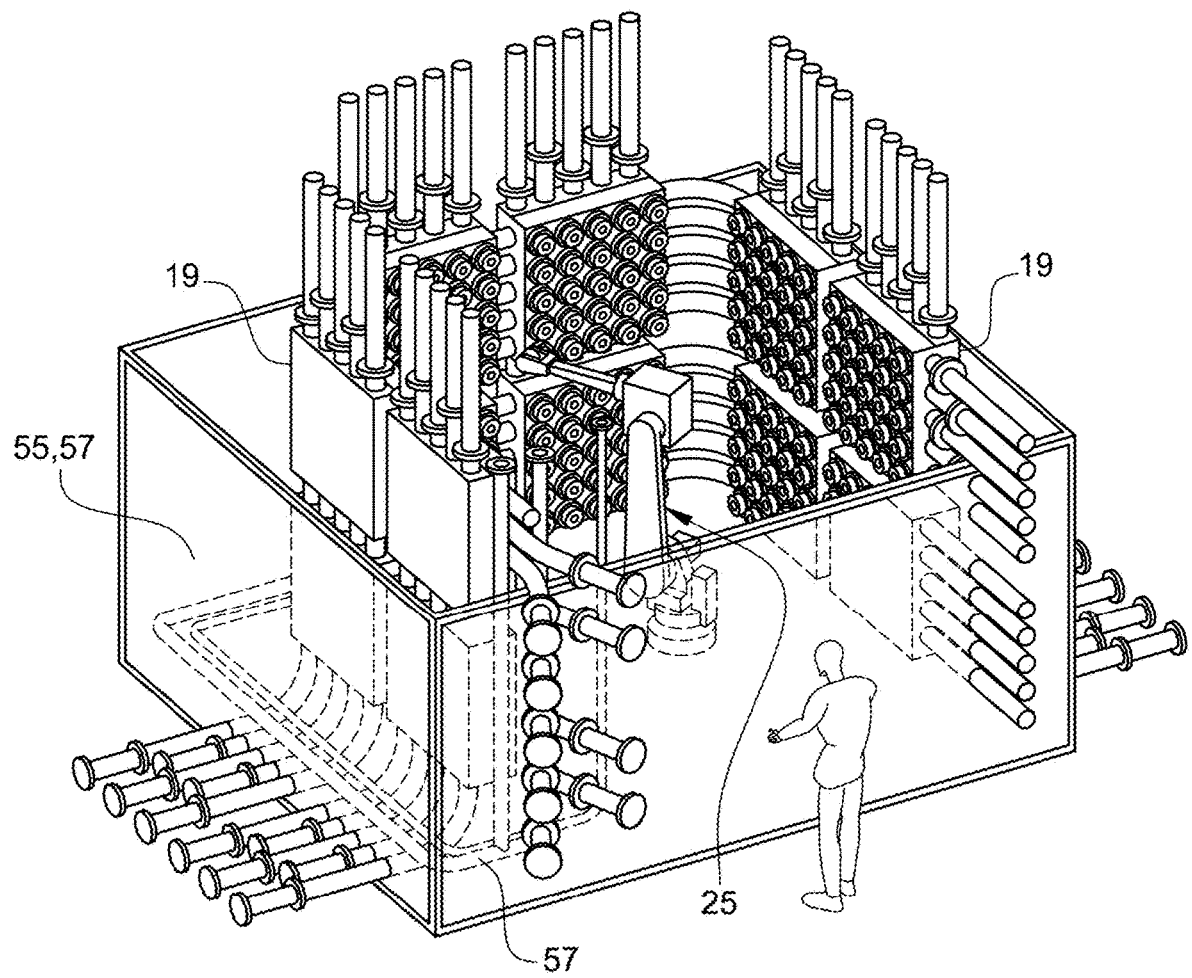
FIG. 5 is a perspective view of the robotized manifold system with a protection cage.

As illustrated in FIG. 5, the robotized manifold system 1 comprises a protection cage 55 configured to be installed around the plurality of bistable valves 21 and the robot 25.

The protection cage 55 comprises joined panels 57 disposed around the walls 19 and the robot 25. Each panel 57 comprises at least one transparent portion. The protection cage 55 is configured to have a moving portion such as a door to penetrate inside an area defined by the protection cage 55.

The above described robotized manifold system 1 can have a limited size. The arm 27 used as a single mechanical actuator of the plurality of bistable valves 21 enables to minimize the equipment used for actuation. This engenders free space in proximity of the bistable valves 21 which facilitates the installation of the robotized manifold system 1 in a reduced space.

Maintenance as well is reduced and easy thanks to the reliability of the arm 27 that has few moving parts. The simple design of the robotized manifold system 1 also reduces investment cost.

There is also a security aspect to this configuration as the robot 25 is surrounded by the walls 19. This creates a safety zone that could be delimited to prevent access in proximity of the robot 25 when operating.

As goes without saying, the present disclosure is not limited to the sole embodiment described above by way of example, it encompasses all the variants.

The invention claimed is:

1. A robotized manifold system, comprising:
   a pipe matrix including a first series of pipes extending according to a first direction and being comprised in a first layer of the pipe matrix and a second series of pipes extending according to a second direction transverse to the first direction and extending in a second layer of the pipe matrix, the pipe matrix being organized according to at least two walls extending transversally to each other or at least one curved wall, each wall comprising a portion of the first layer and the second layer,
   a plurality of bistable valves being distributed on the at least two walls or at least one curved wall, each bistable valve including a shutter body configured to constitute a portion of a pipe of the first series of pipes and a portion of a pipe of the second series of pipes in a line position and to link-said pipes of the first series of pipes and the second series of pipes in a transverse position, a robot with an arm configured to individually actuate each shutter body of the plurality of bistable valves.

2. The robotized manifold system according to claim 1, wherein each shutter body of the plurality of bistable valves is arranged to rotate between the line position and the transverse position according to an actuating axis transverse to an extension plane of the wall on which the shutter body is installed.

3. The robotized manifold system according to claim 2, wherein each bistable valve comprises a removable external flange, the corresponding shutter body being withdrawable from a rest of the bistable valve transversally to the extension plane of the wall on which the shutter body is installed when the external flange is removed.

4. The robotized manifold system according to claim 1, wherein the pipe matrix comprises three walls organized according to a U shape, the robot being located between the two walls facing each other.

5. The robotized manifold system according to claim 1, wherein the first series of pipes each comprises an elbow portion between the at least two walls.

6. The robotized manifold system according to claim 1, wherein each wall comprises of a plurality of valve modules, each valve module comprising bistable valves organized in lines and columns and connecting ports at both ends of the lines to the first series of pipes and at both ends of the columns to the second series of pipes.

7. The robotized manifold system according to claim 1, wherein the pipe matrix comprises a stand assembly arranged to be set on a flat ground, the stand assembly comprising at least two unitary elements, each being dedicated for a corresponding wall, the first direction being horizontal and the second direction being vertical.

8. The robotized manifold system according to claim 7, wherein the stand assembly comprises feet to position the at least two walls at a determined distance from the flat ground.

9. The robotized manifold system according to claim 8, comprising lower inlet and outlet pipes linked to corresponding pipes of the second series of pipes, the lower inlet and outlet pipes being curved to change from a vertical orientation at a connection area with the pipes of the second series of pipes to a horizontal orientation.

10. The robotized manifold system according to claim 1, wherein each pipe of the first series of pipes and each pipe of the second series of pipes are configured to enable circulation of a pig for cleaning the pipe when all corresponding bistable valves are in line position.

11. The robotized manifold system according to claim 1, wherein the arm comprises at least three fractions configured to rotate with respect to each other and a centralized command arrangement including sensors for controlling the arm.

12. The robotized manifold system according to claim 1, comprising a guiding structure configured to receive the robot, the robot being configured to move between to end positions when received in the guiding structure.

13. The robotized manifold system according to claim 12, wherein the guiding structure is a rail structure configured to cooperate with a complementary support structure of the robot.

14. The robotized manifold system according to claim 1, comprising a protection cage configured to be installed around the plurality of bistable valves and the robot.

15. The robotized manifold system according to claim 4, wherein the pipe matrix comprises three walls organized according to a U shape, the robot being located between the two walls facing each other.

16. The robotized manifold system according to claim 15, wherein the first series of pipes each comprises an elbow portion between the at least two walls.

17. The robotized manifold system according to claim 16, wherein each wall comprises of a plurality of valve modules, each valve module comprising bistable valves organized in lines and columns and connecting ports at both ends of the lines to the first series of pipes and at both ends of the columns to the second series of pipes.

18. The robotized manifold system according to claim 17, wherein the pipe matrix comprises a stand assembly arranged to be set on a flat ground, the stand assembly comprising at least two unitary elements, each being dedicated for a corresponding wall, the first direction being horizontal and the second direction being vertical.

19. The robotized manifold system according to claim 18, wherein the stand assembly comprises feet to position the at least two walls at a determined distance from the flat ground.

20. The robotized manifold system according to claim 19, comprising lower inlet and outlet pipes linked to corresponding pipes of the second series of pipes, the lower inlet and outlet pipes being curved to change from a vertical orientation at a connection area with the pipes of the second series of pipes to a horizontal orientation.

* * * * *